United States Patent
Huang et al.

(10) Patent No.: US 7,689,624 B2
(45) Date of Patent: Mar. 30, 2010

(54) GRAPH-BASED SEARCH LEVERAGING SENTIMENT ANALYSIS OF USER COMMENTS

(75) Inventors: Shen Huang, Beijing (CN); Min Wang, Beijing (CN); Jian-Tao Sun, Beijing (CN); Zheng Chen, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 11/712,808

(22) Filed: Mar. 1, 2007

(65) Prior Publication Data
US 2008/0215543 A1 Sep. 4, 2008

(51) Int. Cl.
*G06F 17/30* (2006.01)
(52) U.S. Cl. .................. 707/760; 707/798; 715/700
(58) Field of Classification Search .............. 707/1–5, 707/10, 100, 102; 715/700
See application file for complete search history.

(56) References Cited

U.S. PATENT DOCUMENTS

| | | | | |
|---|---|---|---|---|
| 5,579,471 | A * | 11/1996 | Barber et al. ............... | 715/700 |
| 5,930,154 | A | 7/1999 | Thalhammer-Reyero .... | 364/578 |
| 6,070,149 | A | 5/2000 | Tavor et al. ................ | 705/26 |
| 6,125,352 | A | 9/2000 | Franklin et al. ............. | 705/26 |
| 6,757,646 | B2 | 6/2004 | Marchisio ................... | 704/8 |
| 6,795,810 | B2 | 9/2004 | Ruppelt et al. .............. | 705/26 |
| 6,834,298 | B1 | 12/2004 | Singer et al. ............... | 709/220 |
| 6,993,723 | B1 | 1/2006 | Danielsen et al. ........... | 715/751 |
| 7,523,137 | B2 * | 4/2009 | Kass et al. .................. | 707/104.1 |
| 2002/0169759 | A1* | 11/2002 | Kraft et al. .................. | 707/3 |
| 2005/0154750 | A1* | 7/2005 | Zhou et al. .................. | 707/102 |
| 2005/0256867 | A1 | 11/2005 | Walther et al. .............. | 707/5 |
| 2006/0074870 | A1* | 4/2006 | Brill et al. .................. | 707/3 |
| 2006/0200342 | A1 | 9/2006 | Corston-Oliver et al. .... | 704/10 |
| 2006/0235841 | A1 | 10/2006 | Betz et al. .................. | 707/5 |
| 2006/0242040 | A1 | 10/2006 | Rader ......................... | 705/35 |
| 2006/0248087 | A1 | 11/2006 | Agrawal et al. ............. | 707/10 |
| 2007/0042369 | A1* | 2/2007 | Reese et al. ................. | 435/6 |

OTHER PUBLICATIONS

Natalie Galnce, "Community Search Assistant", 2001, ACM, pp. 91-96.*
Robert Malouf et al., "Mining Web Text for Brand Asociations," Http://arxiv.org/PS_ cache/cs/pdf/0601/0601045.pdf, In Computational Approaches to Analyzing Webblogs, Papers from the 2006 AAAI Spring Symposium, Technical Report ss-06-03, Published by the AAAI Press, Menlo Park, CA, 2006, pp. 1-3.

(Continued)

*Primary Examiner*—Cam-Linh Nguyen
(74) *Attorney, Agent, or Firm*—Alan G. Rego; Westman, Champlin & Kelly P.A.

(57) ABSTRACT

A search system and method is provided. The method includes constructing a graph-based query that is indicative of a user's preference-levels for different features of a search item (a product, for example). The constructed graph-based query is executed by comparing the user's preference-levels for the different features of the product, which are graphically represented in the query, with information related to sentiments expressed by other users regarding the product. Information related to the sentiments expressed by other users regarding the product can include system-generated product performance graphs constructed from comments regarding the product obtained from the World Wide Web (or other network). Results returned and output upon execution of the graph-based query include system-generated product performance graphs that are similar to the user-submitted query.

20 Claims, 7 Drawing Sheets

OTHER PUBLICATIONS

K. Fujimura et al., "Blogranger-A Multi-faceted Blog Search Engine," Http://www.blogpulse.com/www2006-workshop/papers/wwe2006-fujimura.pdf, copyright is held by author/owner, May 22-26, 2006, pp. 1-7.

O. Kurland et al., "PageRank without Hyperlinks: Structural Re-Ranking using Links Induced by Language Models," In Proceedings of SIGIR'05, Aug. 15-19, 2005, pp. 1-8.

"ViewScore- Consumer Facing Social Media Analytics," http://datamining.typepad.com/data_mining/sentiment_mining/index.html, Article in the Document-Data Mining: Text Mining, Visualization and Social Media, Aug. 31, 2006, pp. 1-3.

International Search Report from counterpart foreign Application No. PCT/US2008/055576.

* cited by examiner

| DIGITAL CAMERA | PHOTOGRAPH | RETURNED SYSTEM-GENERATED PRODUCT PERFORMANCE GRAPHS |
|---|---|---|
| CAMERA BRAND A 2.3MP DIGITAL CAMERA W/ 3X OPTICAL ZOOM |  |  |
| CAMERA BRAND B DIGITAL CAMERA |  |  |
| CAMERA BRAND C DIGITAL CAMERA |  |  |
| CAMERA BRAND D DIGITAL CAMERA |  |  |

GRAPH-BASED SEARCH LEVERAGING SENTIMENT ANALYSIS OF USER COMMENTS

BACKGROUND

In several search systems, such as current product search systems, two search interfaces are often provided: keyword search and structural search. In a keyword search for a particular type of product, for example, a user inputs a query that includes one or more terms and the system retrieves products based on term matching between the input query and product names or product descriptions. In a structural search, the user's intention is specified by product attributes and the corresponding attribute values. For example, a user can search for digital cameras by brand, price range, megapixel numbers, etc., and obtain product-related results. However, the above two approaches have some drawbacks. Firstly, in many cases, keywords are not sufficient to fully express a user's shopping needs. Secondly, some product knowledge is necessary when structural search functionality is used. For example, when a user searches for digital cameras based on an "ImagePixel" attribute, some prior knowledge about this attribute and its possible values is needed. Thus, when used for product searches, for example, both keyword and structural search techniques can be relatively complex and may not produce search results that satisfy a user's needs.

The discussion above is merely provided for general background information and is not intended to be used as an aid in determining the scope of the claimed subject matter.

SUMMARY

A search system and method that addresses at least some of the above-described problems is provided. The method includes constructing a graph-based query that is indicative of a user's preference-levels for different features of a search item (a product, for example). The constructed graph-based query is executed by comparing the user's preference-levels for the different features of the product, which are graphically represented in the query, with information related to sentiments expressed by other users regarding the product. Information related to the sentiments expressed by other users regarding the product can include system-generated product performance graphs constructed from comments regarding the product obtained from the World Wide Web (or other network). Results returned and output upon execution of the graph-based query include system-generated product performance graphs that are similar to the user-submitted query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present embodiments provide a graph-based search system and method that is based to a large extent on sentiment analysis technologies. Although the following description primarily provides detailed examples of graph-based product search systems, the teachings of the present embodiments can be applied to any search system.

Figure 1:
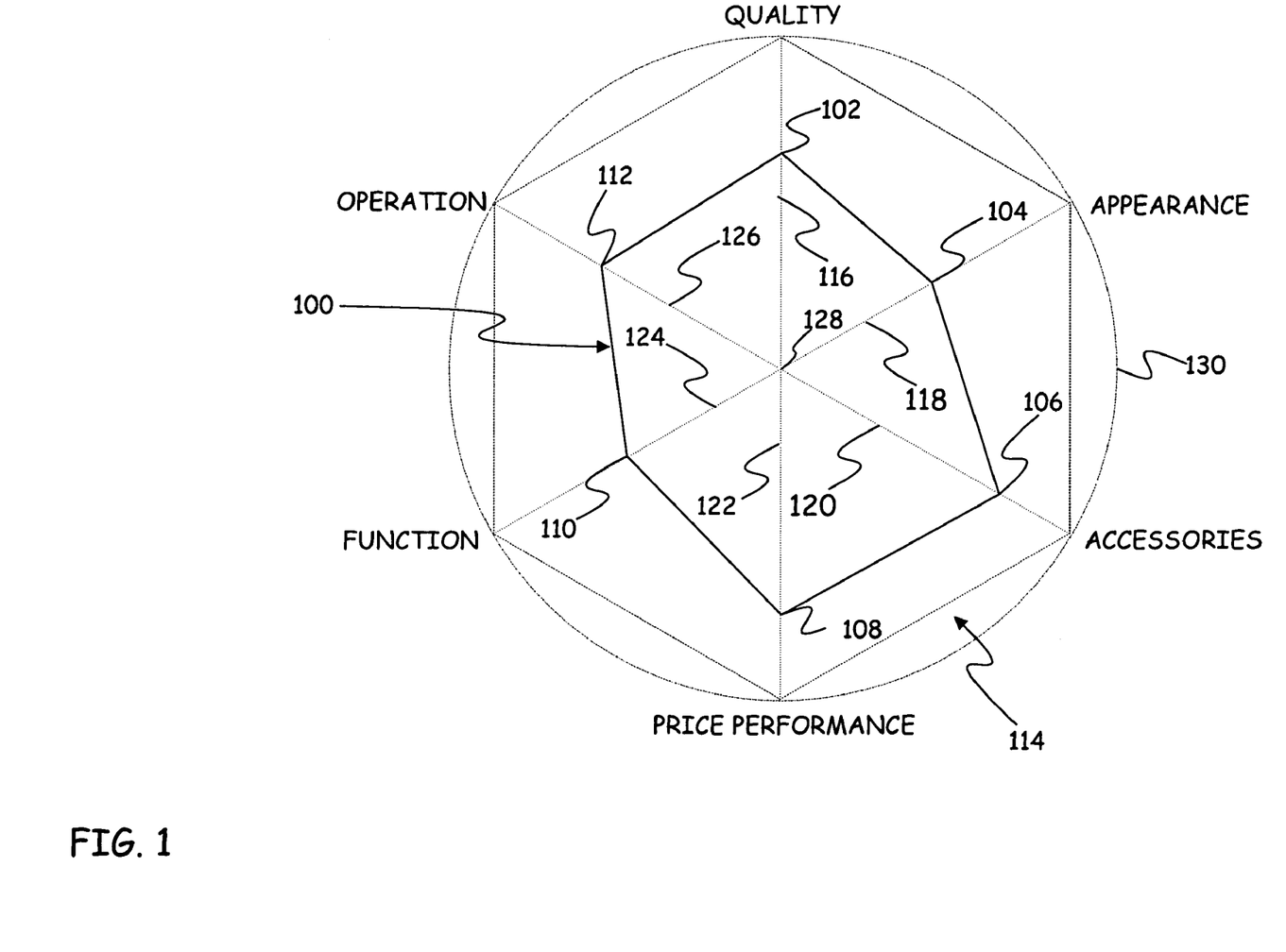
FIG. 1 is a diagrammatic illustration of a graph-based query that is constructed using a radar graph in accordance with one of the present embodiments.

As noted earlier, in existing product search systems, searches are conducted based on objective information about products, such as terms contained in a product name, product attributes, etc. In contrast, as noted above, the graph-based search of the present embodiments is based on sentiment analysis technologies. By carrying out an analysis of user comment data collected from the World Wide Web, for example, it is possible to understand Web users' attitudes towards products, as well as their sentiments on product features. Thus, as will be discussed in detail further below, products can be mapped into a vector space, whose dimensions correspond with product features, and a position of each product within the vector space can be calculated from the user comment data. In order to give a meaningful and relatively straightforward visualization of the product features, each product is plotted with a polygon, bounded by any suitable number of line segments. An example of such a polygon is shown in FIG. 1, which illustrates a six-sided polygon 100. Each node (102, 104, 106, 108, 110 and 112) of example polygon 100 corresponds with a product feature and its value measures a relative subjective score calculated from user comment data. With such scores, a radar graph 114, that includes axes on which positions of nodes of a polygon such as 100 can be adjusted, can be used as an interactive model to provide a suitable interface for conducting a product search. In the example embodiment of FIG. 1, radar graph 114 includes axis lines 116, 118, 120, 122, 124 and 126 that start at a center 128 of a circle 130 and extend to its periphery through nodes 102, 104, 106, 108, 110 and 112, respectively, of polygon 100. As shown in FIG. 1, each axis 116, 118, 120, 122, 124, 126 can represent an independent measure related to a single product feature, such as appearance, price-performance, function, etc. The axes 116, 118, 120, 122, 124 and 126 include multiple measures that require different quantitative scales.

The above-described approach provides a number of benefits in connection with carrying out product searches. Such benefits include enabling users to issue a query using a graph, which is substantially intuitive. As will be described in detail further below, a graph-based query interface is relatively easy to operate and allows users to indicate their preferences over product features without much complexity.

By calculating the similarity of a user issued graph and those plotted based on user comment mining, products can be effectively ranked according to their distance from an ideal product specified by an end user. At the same time, products can be ranked in a subjective space, which is constructed from sentiment analysis results of user comment data. That is, one user's search is based on the sentiments of other users.

Also, using graphs, end users can make direct comparisons between products, which greatly assist users in selecting products. Further, market analyzers can relatively easily understand advantages as well as drawbacks of their products by reading product graphs.

For simplification, in the remaining portion of the detailed description, a polygon such as 100, which is plotted in a radar graph such as 114, is referred to as a user-desired product performance graph, when used as a user-constructed query, and referred to as a system-generated product performance graph when constructed automatically from user comments, regarding products, obtained from the World Wide Web or other network.

Figure 2A:
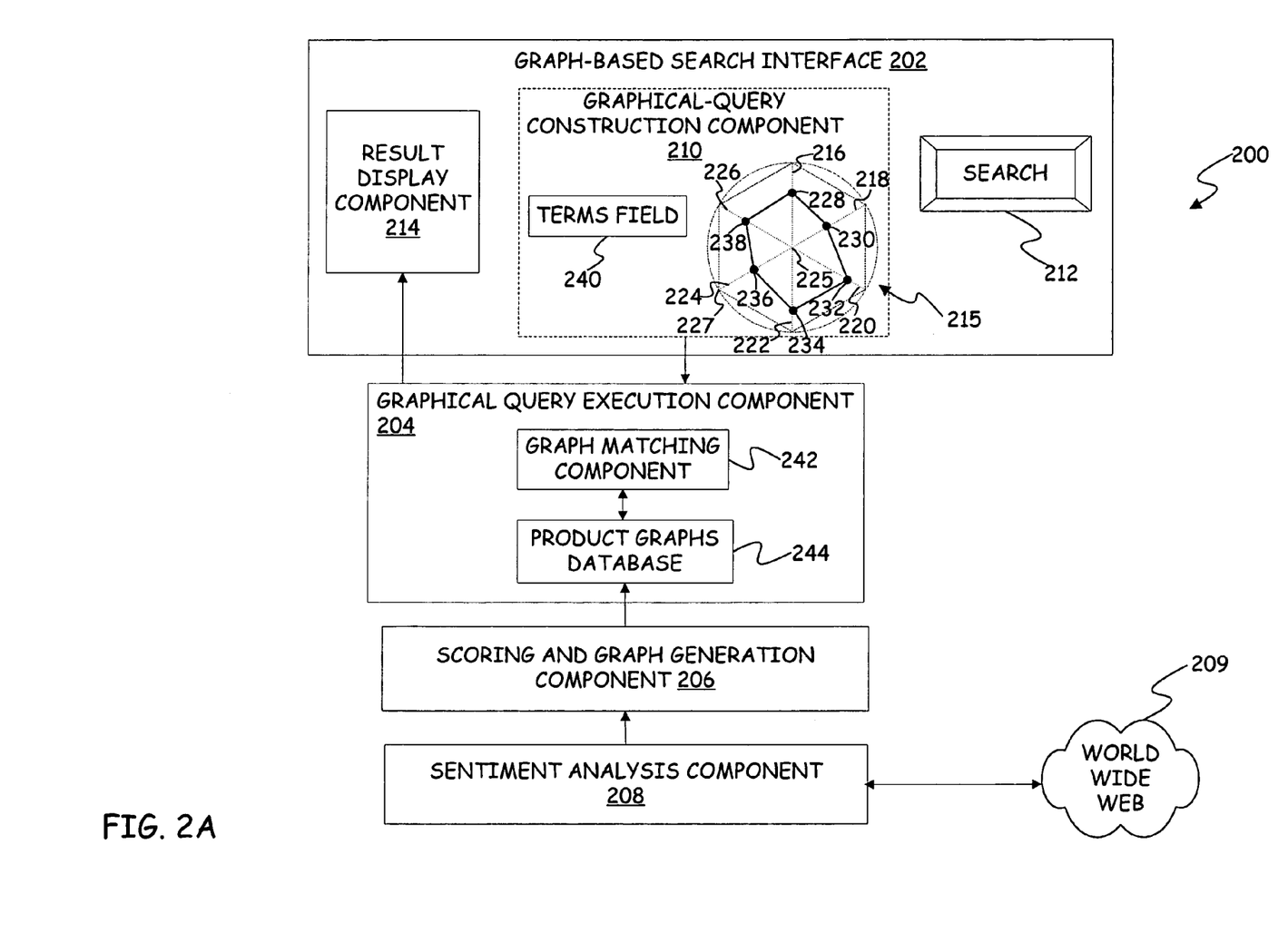
FIG. 2A is a simplified block diagram of a product search system that utilizes product graphs in accordance with one of the present embodiments.

FIG. 2A shows an exemplary embodiment of a product search system 200 that employs product performance graphs. Product search system 200 includes, as its primary components, a graph-based search interface 202, a graphical-query execution component 204, a scoring and graph generation component 206 and a sentiment analysis component 208.

In general, graph-based search interface 202 is designed substantially based on a user's psychology model rather than on a machine model. Interface 202 is configured to essentially simulate a user's natural behavior in the real world. Graph-based search interface 200 includes a graphical-query construction component 210, a graphical-query submission component 212 and a query-result display component 214. In general, graphical-query construction component 210 is configured to allow a user to graphically indicate a degree of preference of at least one feature of a search item (for example, at least one feature of a product) and to thereby construct a graph-based query. More specifically, graphical-query construction component 210 includes a configurable graph 215 (which is similar to the graph of FIG. 1) in which each axis 216, 218, 220, 222, 224, 226 represents one feature of a product, for example. To construct a graph-based query, a user can, for example, drag and drop, one or more different nodes (such as 228, 230, 232, 234, 236 and 238) in desired positions along one or more of the different corresponding axes 216, 218, 220, 222, 224 and 226 and thereby express search preferences corresponding to features of a product. A center 225 of graph 215 can represent zero or some minimum degree of preference for a product feature and an outer end (such as 227) of an axis can represent a maximum preference for a product feature. Of course, any other suitable method of representing preferences for product features may be used. In some of the present embodiments, a user can optionally include one or more keywords in field 240 as part of the query. Execution of a graph-based query can be initiated by graphical-query submission component 214. Component 214 can include a button, that is configured to receive a graphical-search initiation command (such as a mouse click) from a user, and suitable code linked to the button, which can, upon receipt of the command by the button, responsively submit the graph-based query for execution by component 204.

Figure 2B:
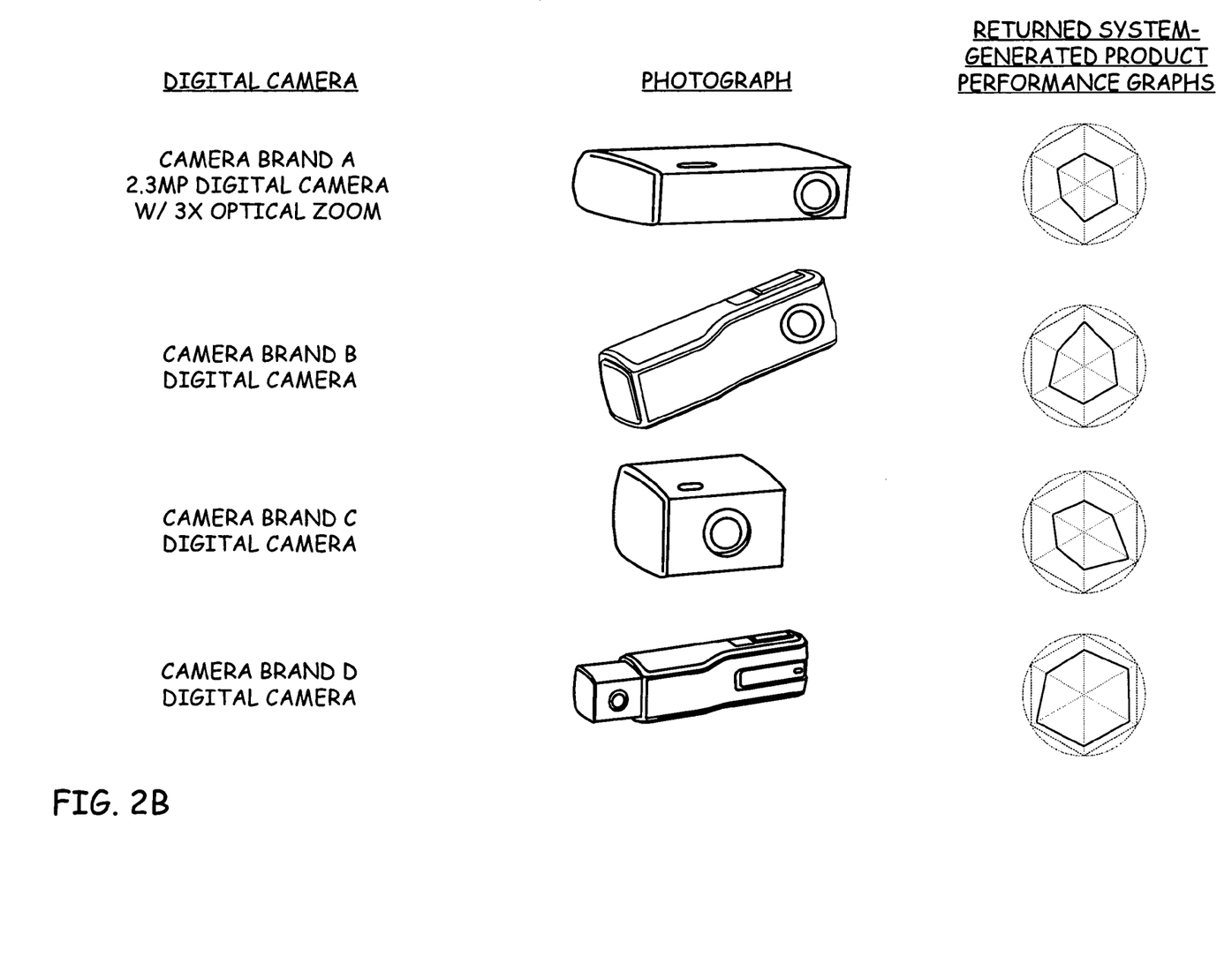
FIGS. 2B and 2C are diagrammatic illustrations of results obtained by executing an example graph-based query.
Figure 2C:
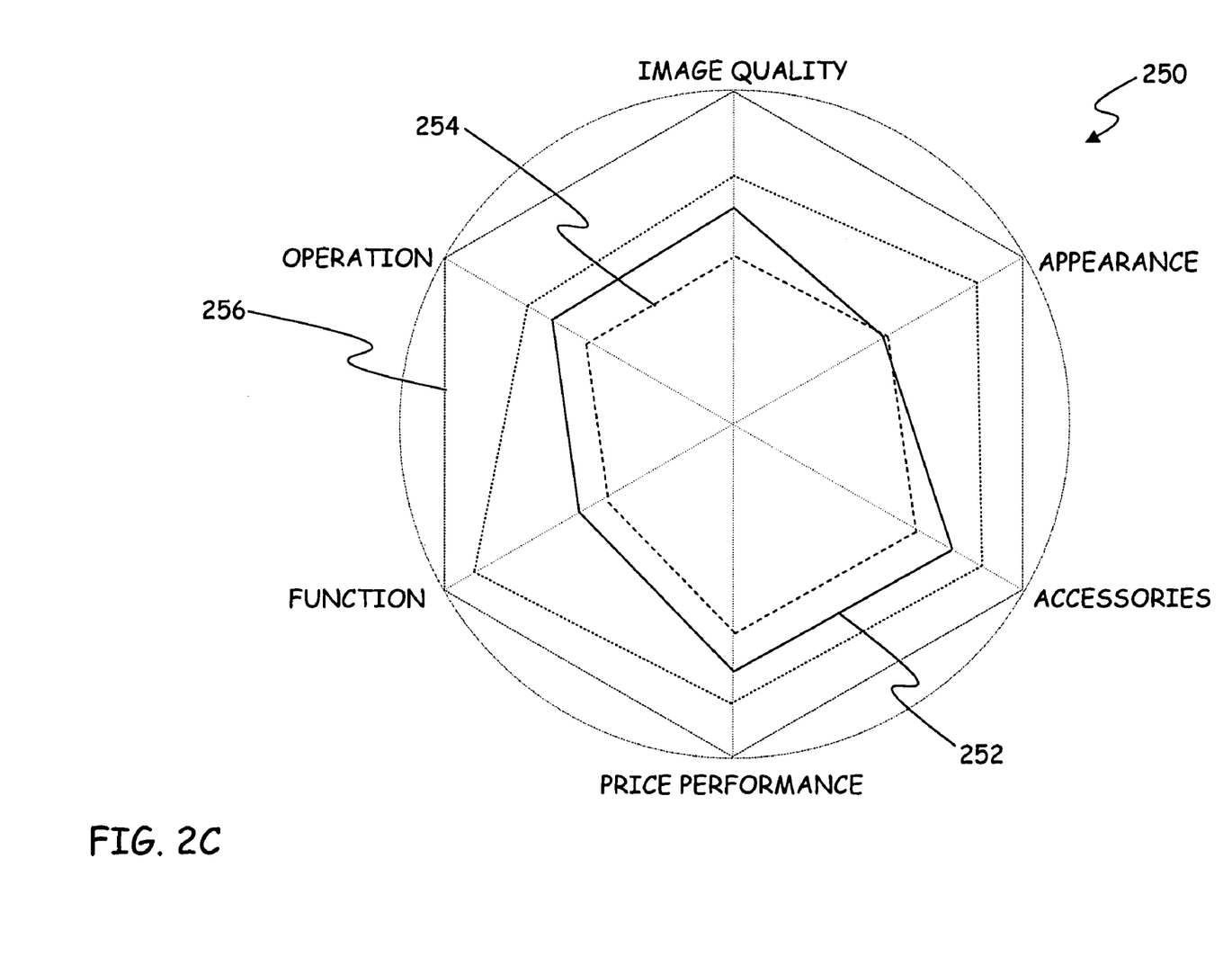

Graphical-query execution component 204 is configured to match a user-desired product performance graph, included within a graph-based query, with system-generated product performance graphs constructed from product-related user comments obtained from the World Wide Web (denoted by reference numeral 209 in FIG. 2), for example. Specifically, graphical-query execution component 204 includes a graph-matching component 242 and a product graphs database 244, which includes a plurality of system-generated product performance graphs. As noted above, such graphs may be generated from product-related user comments obtained from the World Wide Web, for example. Upon receipt of a submitted graph-based query, graph-matching component 242 matches the submitted user-desired product performance graph with product system-generated product performance graphs, stored in database 244, and retrieves system-generated product performance graphs with performance behaviors similar to that of the submitted user-desired product performance graph. FIG. 2B illustrates, in tabular form, results (returned system-generated product performance graphs) obtained by graph-matching component 242 when the user-desired product performance graph includes degrees of preferences of certain features for a digital camera. For simplification, the features of the digital camera addressed in the returned system-generated product performance graphs are not shown in FIG. 2B. The results can be arranged/ranked in display component 214, which can be a separate screen or a section of a screen, in an order of closeness to the submitted graph-based query, for example. However, instead of displaying individual returned system-generated product performance graphs separately as shown in FIG. 2B, when several returned system-generated product performance graphs are put together, it is substantially simpler to depict the overall features of a product and to make comparisons among products. Thus, in some embodiments, results returned form graphical-query execution component 204 are displayed as overlapped graphs in query-result display component 214. A user can relatively easily observe the major advantages/disadvantages of the products through the overlapped graphs. For example, in FIG. 2C, which shows some of the returned system-generated product performance graphs of FIG. 2B in an overlapping relationship with the submitted user-desired product performance graph (denoted by reference numeral 252), users can quickly understand which features of camera brand A (denoted by reference numeral 254), for example, are better/worse than corresponding features in camera brand D (denoted by reference numeral 256), for example.

As noted earlier, product graph generation is based on sentiment analysis and therefore, as can be seen in FIG. 2A, database 244 receives its system-generated product performance graphs from scoring and graph generation component 206, which, in turn, receives its input from sentiment analysis component 208. Sentiment analysis component 208 crawls the Web (or other similar system having user-comments that are product related) to obtain user-comments and utilizes categorization algorithms (or sentiment classifiers) to categorize user comments into positive and negative ones. The product features as well as users' sentiments on these features are automatically identified using suitable algorithms. Subsequently, in component 242, suitable scoring algorithms are utilized to estimate user satisfaction towards product features, which are, in turn, used to automatically generate product performance graphs.

Figure 3A:
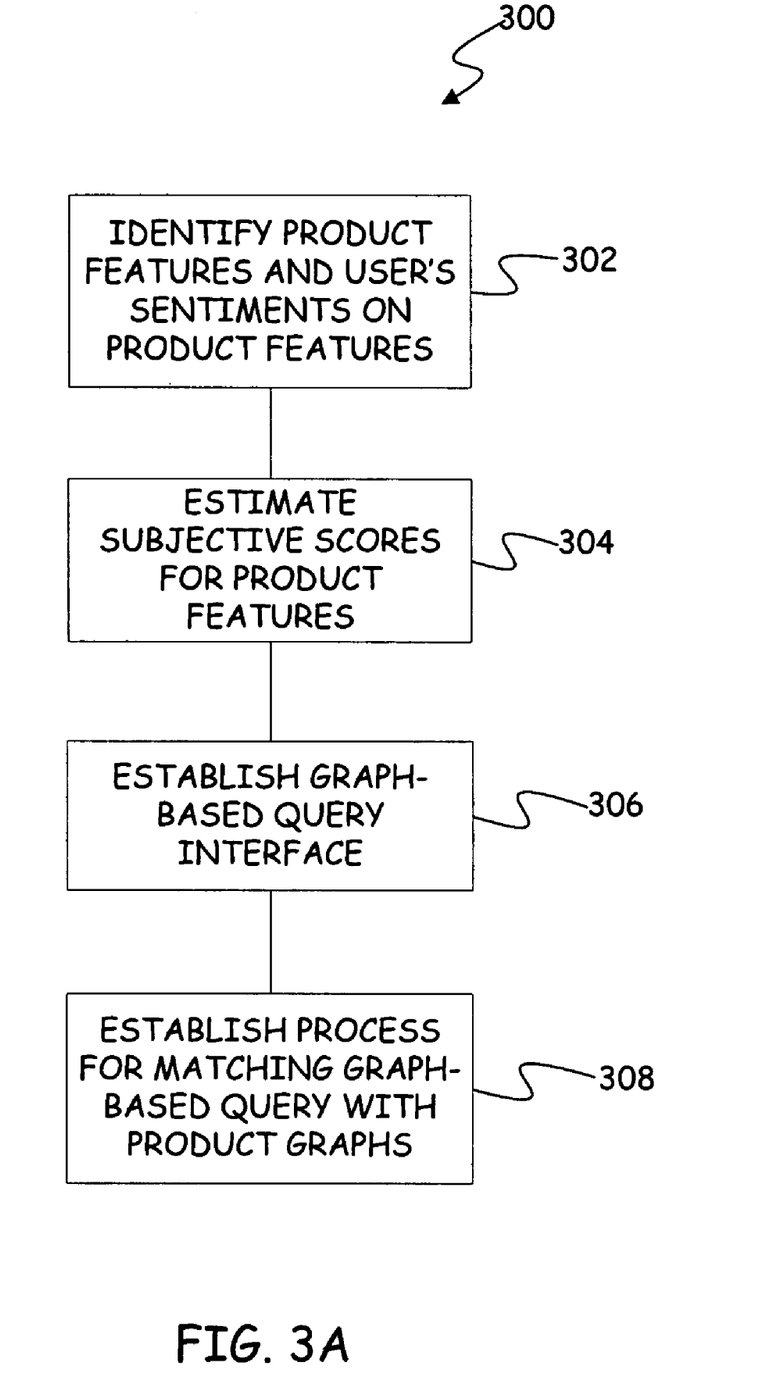
FIG. 3A is a flow diagram illustrating a method of developing a product search system according to one embodiment.
Figure 3B:
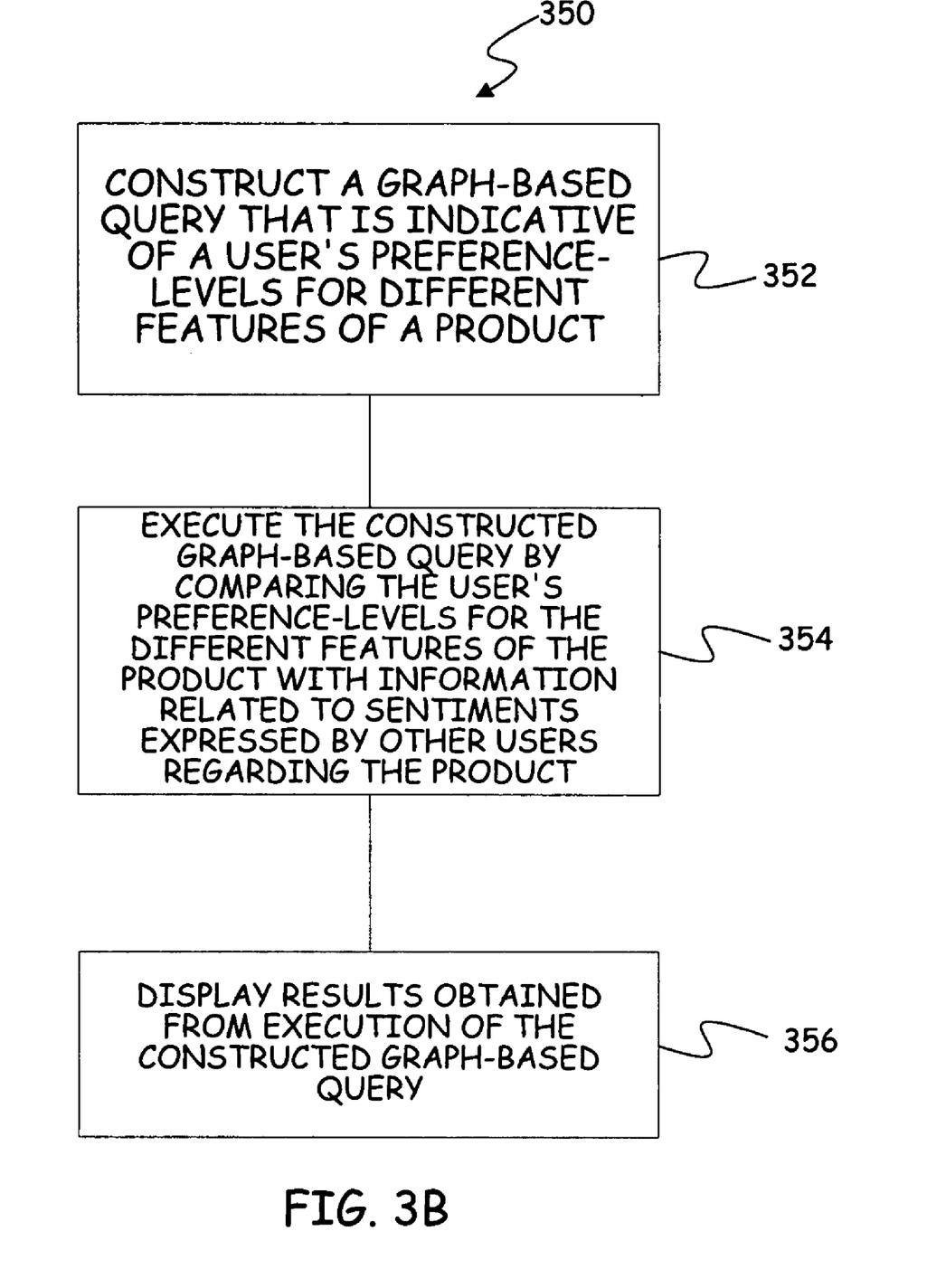
FIG. 3B is a flow diagram illustrating a method of conducting a product search according to one embodiment.

In conclusion, referring now to FIGS. 3A and 3B, flow diagrams 300 and 350 are provided to briefly illustrate a process that is employed by one embodiment to develop a product search system and a method of carrying out a product search according to another embodiment. A first step in the process of FIG. 3A involves mining product comments from the World Wide Web, for example, and then automatically identifying sentences containing users' sentiments from the comment data. The identified sentences are classified as positive or negative using any suitable sentiment analysis technique. These sentences are also processed to identify product features and users' sentiments on product features. This is illustrated at step 302. After the sentiments for each sentence and the product features are identified, at step 304, subjective scores for product features are automatically estimated. Based on the estimated scores, a performance graph for each product is calculated. At step 306, a graph-based query interface is established. With the help of this interface, users can operate on a graph to specify their shopping needs. In a specific embodiment of the graph-based query interface, nodes of a polygon can be dragged to indicate whether a user has a higher/lower requirement regarding a particular product feature. A user-constructed graph-based query can be issued from the interface. Once a user issues a graph-based query, products can be ranked using graph-based match. For example, a multi-dimensional vector can be used to represent each graph. The similarity between graphs can be calculated using, for example, the following cosine function.

$$\cos(u, v) = \frac{u^T v}{\|u\| \cdot \|v\|} \qquad \text{Equation 1}$$

where u is vector of a graph included in a graph-based query and v is a vector of a system-generated product performance graph (which can be stored in a database such as 244 (FIG. 2A)), for example. The numerator of Equation 1 shows a direct product of the transpose of vector u and vector v, and the denominator is a determinant product of vectors u and v.

In the method of conducting a product search illustrated in the flow diagram 350 of FIG. 3B, a graph-based query that is indicative of a user's preference-levels for different features of a product is constructed. This is illustrated at step 352. At step 354, the constructed graph-based query is executed by comparing the user's preference-levels for the different features of the product with information related to sentiments expressed by other users regarding the product. At step 356, results obtained from execution of the constructed graph-based query are displayed. Information related to the sentiments expressed by other users regarding the product can include system-generated product performance graphs constructed from comments regarding the product obtained from the World Wide Web. Results returned and output upon execution of the graph-based query include system-generated product performance graphs that are similar to the user-submitted query.

Figure 4:
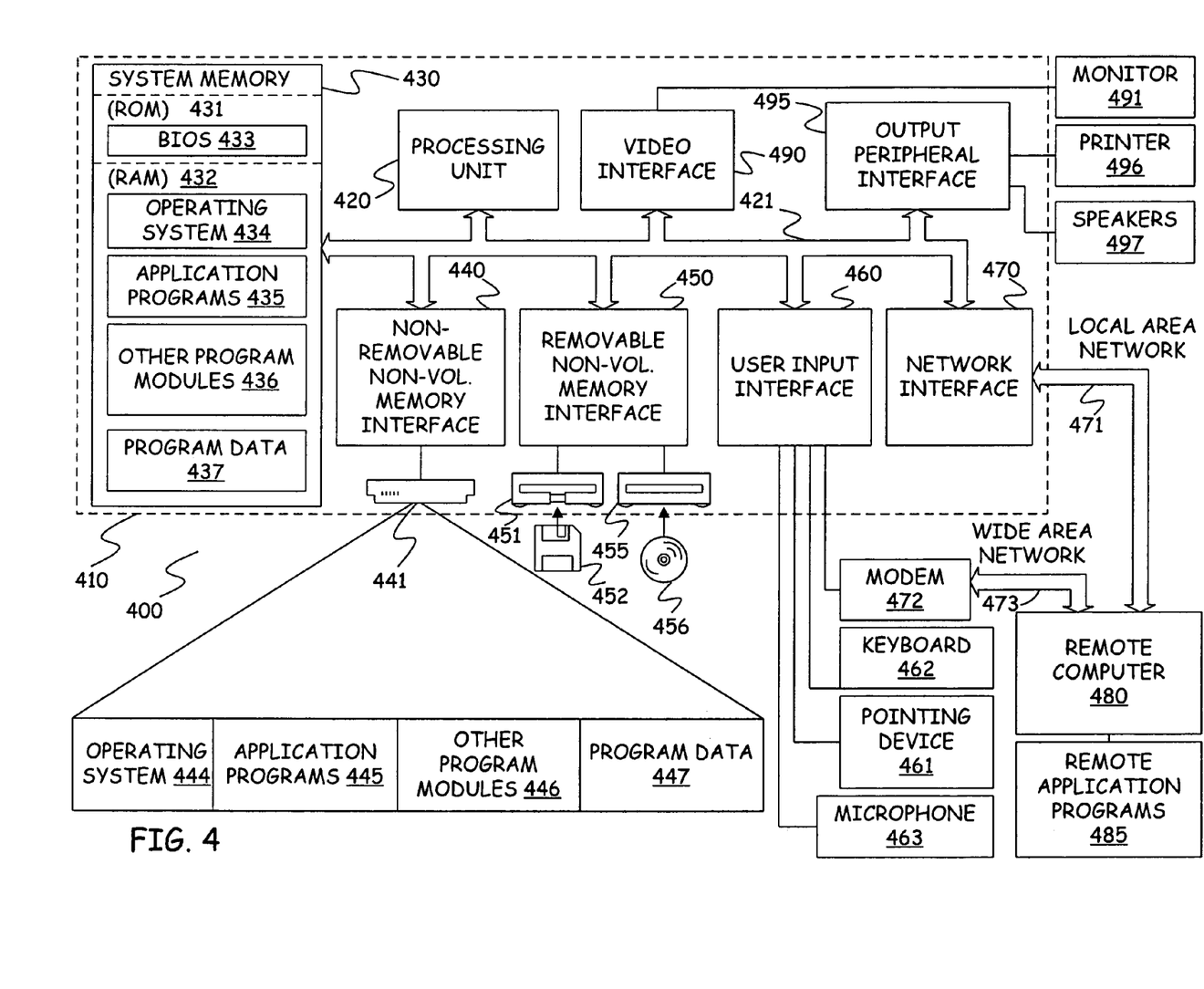
FIG. 4 is a block diagram illustrating an example environment in which the present embodiments can be implemented.

FIG. 4 illustrates an example of a suitable computing system environment 400 on which the present embodiments may be implemented. The computing system environment 400 is only one example of a suitable computing environment and is not intended to suggest any limitation as to the scope of use or functionality of the present embodiments. Neither should the computing environment 400 be interpreted as having any dependency or requirement relating to any one or combination of components illustrated in the exemplary operating environment 400.

The present embodiments operational with numerous other general purpose or special purpose computing system environments or configurations. Examples of well-known computing systems, environments, and/or configurations that may be suitable for use with the present embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The present embodiments may be described in the general context of computer-executable instructions, such as program modules, being executed by a computer. Generally, program modules include routines, programs, objects, components, data structures, etc. that perform particular tasks or implement particular abstract data types. The present embodiments are designed to be practiced in distributed computing environments where tasks are performed by remote processing devices that are linked through a communications network. In a distributed computing environment, program modules are located in both local and remote computer storage media including memory storage devices.

With reference to FIG. 4, an exemplary system for implementing the present embodiments include a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented search system comprising:
a processor; and
a graph-based search interface, executable by the processor, comprising:
a graphical-query construction component configured to allow a user to graphically indicate, on a radar graph, a degree of preference of at least one feature of a search item and to thereby construct a graph-based query; and
a graphical-query submission component configured to receive a graphical-search initiation command from the user and to responsively submit the graph-based query for execution,
wherein the radar graph is a representation in a vector space, the radar graph includes axes on which positions of nodes of a polygon are adjustable to indicate the degree of preference of the at least one feature of the search item.

2. The system of claim 1 wherein the search system is a product search system, the search item is a product, the at least one feature is one of a plurality of features of the product and the graph-based query comprises a user-desired product performance graph.

3. The system of claim 2 and further comprising a graphical-query execution component which is configured to execute the graph-based query by comparing the user-desired product performance graph with system-generated product performance graphs.

4. The system of claim 3 wherein the graphical-query execution component is further configured to return system-generated product performance graphs, which are similar to the user-desired product performance graph, to the graph based search interface.

5. The system of claim 4 wherein the graph based search interface further comprises a query-result display component configured to display the returned system-generated product performance graphs.

6. The system of claim 5 wherein the returned system-generated product performance graphs are ranked based on degrees of similarity to the user-desired product performance graph.

7. The system of claim 6 wherein the returned system-generated product performance graphs and the user-desired product performance graph are displayed as overlapping graphs.

8. The system of claim 3 wherein the system-generated product performance graphs are stored in a product graphs database.

9. The system of claim 3 wherein the system-generated product performance graphs are constructed from comments regarding the product obtained from the World Wide Web.

10. The system of claim 9 wherein the comments regarding the product are obtained from the World Wide Web by a sentiment analysis component that is further configured to identify product features and sentiments on product features from the comments.

11. The system of claim 10 and further comprising a scoring and graph generation component which is configured to automatically estimate subjective scores for the product features identified from the comments and to construct the system-generated product performance graphs based on the estimated subjective scores.

12. A computer-implemented method comprising:
constructing, by a processor, a query that is indicative of a user's preference-levels for different features of a product, the query being constructed using a radar graph that includes axes on which positions of nodes of a polygon are adjustable to indicate the user's preference-levels for different features of the product; and
executing, by the processor, the constructed query by comparing the user's preference-levels for the different features of the product with information related to sentiments expressed by other users regarding the product;
outputting results obtained from execution of the constructed query,
wherein the information related to the sentiments expressed by the other users regarding the product is mapped into a vector space with dimensions that correspond with the different features of the product.

13. The method of claim 12 wherein the information related to the sentiments expressed by the other users regarding the product comprises system-generated product performance graphs constructed from comments regarding the product obtained from the World Wide Web.

14. The method of claim 13 wherein outputting results obtained from execution of the constructed query comprises displaying system-generated product performance graphs that are similar to the user-desired product performance graph ranked based on degrees of similarity to the user-desired product performance graph.

15. The method of claim 13 wherein outputting results obtained from execution of the constructed query comprises displaying system-generated product performance graphs that are similar to the user-desired product performance graph and the user-desired product performance graph as overlapping graphs.

16. A computer-implemented graph-based search interface comprising:
a processor;
a graphical-query construction component, executable by the processor, configured to allow a user to construct a graph-based query by adjusting positions of nodes of a polygon on different corresponding axes of a radar graph in which each axis of the axes represents an independent measure related to a single product feature, wherein the constructed graph-based query includes a user-desired product performance graph in which the user's preference-levels for different features of a product are represented graphically;
a graphical-query submission component, executable by the processor, configured to receive a graphical-search initiation command from the user and to responsively submit the graph-based query for execution; and
a display component configured to, upon execution of the graph-based query, display returned system-generated product performance graphs that are similar to the user-desired product performance graph.

17. A product search system comprising the graph-based search interface of claim 16.

18. The system of claim 17 and further comprising a graphical-query execution component which is configured to execute the graph-based query by comparing the user-desired product performance graph with system-generated product performance graphs stored in a database.

19. The system of claim 18 wherein the stored system-generated product performance graphs are constructed from comments regarding the product obtained from the World Wide Web.

20. The system of claim 19 wherein the comments regarding the product are obtained from the World Wide Web by a sentiment analysis component that is further configured to identify product features and sentiments on product features from the comments.

* * * * *